June 22, 1965 S. G. BELAK 3,190,263
DOCTOR BLADE ASSEMBLY FOR COATING FLEXIBLE SHEET MATERIALS
Filed July 31, 1961
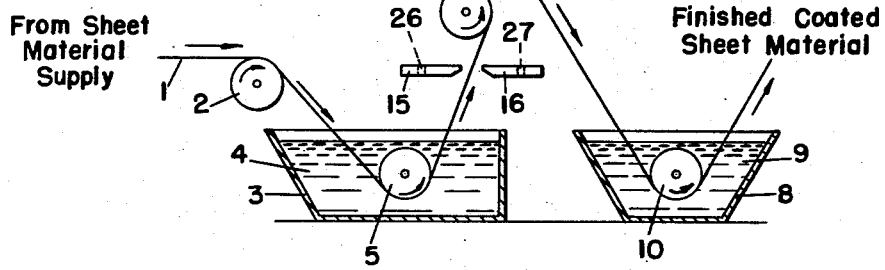
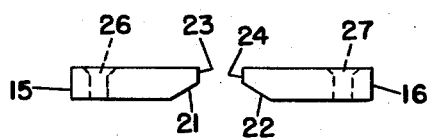
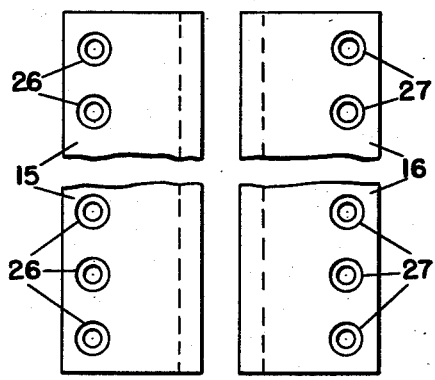
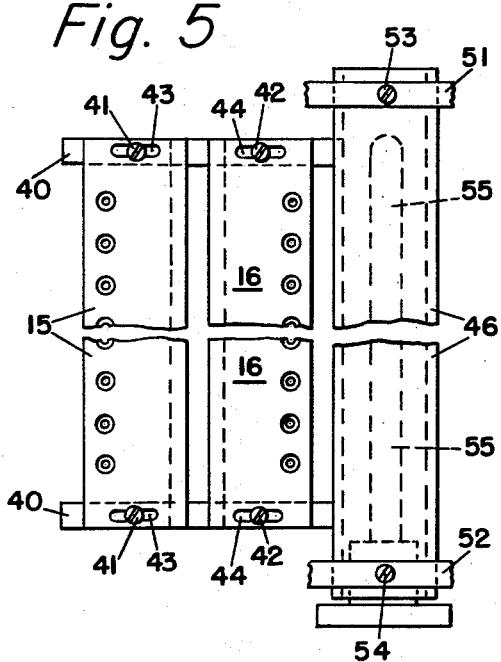
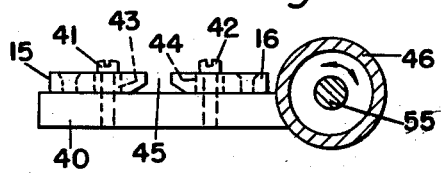
INVENTOR.
STEVEN G. BELAK
BY
ATTORNEY

3,190,263
DOCTOR BLADE ASSEMBLY FOR COATING FLEXIBLE SHEET MATERIALS

Steven G. Belak, Claymont, Del., assignor to Sun Oil Company, Philadelphia, Pa., a corporation of New Jersey
Filed July 31, 1961, Ser. No. 127,995
3 Claims. (Cl. 118—101)

This invention relates to a novel method and apparatus for applying a thin, even film of a normally-solid protective coating composition to a flexible sheet material. More particularly, the invention is directed to a novel method and apparatus which are useful for applying, to a flexible sheet material such as paper, a thin, even film of a normally-solid protective coating composition comprising a suitable wax together with a substantial proportion of a relatively very viscous resin or polymer.

Suitable methods and apparatus for applying the heretofore-commonly-used protective coatings to sheet materials such as paper and cellophane are well-known in the art. Waxes derived from petroleum, viz., petroleum paraffin and/or microcrystalline waxes, or from an animal or vegetable source, have normally constituted the principal component, proportion-wise, of coating compositions heretofore commonly applied to paper. Such compositions frequently have also contained small though significant amounts, but normally less than about 2% by weight, of a relatively non-viscous, relatively low molecular weight resin or plastic material such as polyethylene, polypropylene, and/or the polybutenes. These prior are coating compositions are relatively non-viscous in the molten state, and can be satisfactorily applied with conventional apparatus and in accordance with conventional methods. The conventional method and apparatus most commonly used with these relatively non-viscous molten coating compositions involves passing the sheet material through a bath of the molten coating composition, and thence over a series of doctor rolls while the film of coating composition is still substantially fluid, in order to even out and smooth the coating film before appreciable solidification and/or hardening thereof. The coated sheet material is then passed through a cooling medium, such as air or water, in order to complete the solidification and/or hardening of the protective coating film.

Recently, somewhat similar coating compositions comprising a suitable wax, but containing substantially greater, even predominant, amounts of relatively very viscous, relatively high molecular weight polymers and/or copolymers, or resins, have come into use. These relatively high molecular weight polymers are very viscous when in the molten state. As used herein the term "very viscous" means that the viscosity of the polymer when in its molten state is considerably greater than the viscosity of wax in its molten state; both viscosities being determined at the same or substantially the same temperature. One such very viscous resin so-employed consists of the high molecular weight copolymers of ethylene and vinyl acetate. These coating compositions comprise, for example, either a predominant proportion of a suitable wax such as a petroleum wax together with more than about 3-5% by weight of such very viscous resins or polymers, or a polymer or resin of the type described which has been extended by blending therewith a minor but substantial proportion of a suitable wax. In the molten state, these recently-developed coating compositions are relatively very viscous in comparison with the coating compositions heretofore commonly used. As a result of their relatively high viscosity in the molten state, it has been found that the conventional coating techniques and apparatus are not suitable for providing satisfactory protective coatings of these coating compositions on sheet materials. Specifically, it has been found impossible to obtain smooth, even films of such coatings, with the result that an attractive appearance for the coated product is not achieved. The doctor rolls heretofore conventionally used for smoothing the fluid films of coating composition are quite apparently incapable of satisfactorily handling the relatively much more viscous coating compositions recently developed.

In view of the foregoing, it is an object of this invention to provide a novel method and apparatus which, in addition to being useful with heretofore conventional coating compositions, will also produce a flexible sheet material satisfactorily coated with a normally-solid coating composition of relatively much higher viscosity in the molten state than heretofore used. A more particular object is to provide a novel method and apparatus for applying, to paper and to other flexible sheet materials, a thin, even coating, having a pleasing appearance, of a coating composition a suitable animal, vegetable and/or mineral wax, together with a substantial proportion, greater than 3-5% and on up to and including a predominant proportion, of a relatively very viscous, relatively high molecular weight, wax-compatible polymer and/or copolymer or resin. These and other objects and benefits of this invention will become more readily apparent from a reading of the following detailed description of the invention.

Broadly, the novel method of this invention consists of passing the flexible sheet material, after it has been coated with a thin, substantially-fluid film of the coating composition, and before said film appreciably solidifies and/or hardens, between a pair of doctor blades of novel design and arrangement. After the coated sheet material has been operated on by these doctor blades, it is then subjected to further and conventional treatment, such as by doctor rolls and a cooling medium. Broadly, the novel apparatus of the invention consists of a pair of elongated, usually-rectangular doctor blades of special shape which are suitably fabricated from any rigid sheet material such as steel, Micarta, etc. These blades are mounted in a longitudinally-opposed, coplanar relationship, and are separated by a small adjustable gap through which the coated sheet material passes. In accordance with the invention, the opposing longitudinal edge of each blade is beveled to a critical angle and depth on the side of the blade which faces against the direction of sheet material movement, i.e., on the "leading" side of the blade. The doctor blades also preferably contain apertures for the run-off of excess coating composition, and they are preferably heated by any suitable means. The common plane of the blades is also rotatable about an axis which is parallel with the longitudinal axes of the blades, in order to permit simultaneous application of films of different thicknesses to the two sides of the sheet material.

FIGURE 1 of this application is a schematic diagram of the novel method of the invention, and shows how the conventional coating method has been beneficially modified in accordance with this invention in order to accommodate the recently-developed much more viscous coating compositions. FIGURES 2 and 3 are, respectively, end and top views of one embodiment of the novel doctor blades of the invention, and these figures show their unique and critical design features. FIGURE 4 is an end view of one embodiment of a suitable means for holding the doctor blades in the necessary, critical relationship. FIGURE 5 is a top view of the embodiment of the holding means shown in FIGURE 4. FIGURE 5 also shows one suitable means for heating the doctor blades, and one suitable arrangement for permitting rotative movement of the whole doctor blade assembly.

Referring to FIGURES 2 and 3, the individual doctor blades 15 and 16 are shown as elongated, flat, rectangular blades which can be made of a rigid sheet material such as steel, Micarta, etc. In length the blades slightly exceed the width of the moving sheet material, and their width is such as to impart sufficient rigidity and allow for the inclusion of drainage apertures 26 and 27 and a suitable holding means. The thickness of blades 15 and 16 is dependent upon the material from which they are constructed and, in general, is such as to impart sufficient rigidity and permit fabrication to the necessary shape. One longitudinal edge of each blade is beveled, surfaces 21 and 22, at an angle of about 30°, ±5°, from the transverse axis of the blade, and to a point such that there remains unbeveled straight sides 23 and 24 of not less than 0.01 inch in depth from the sides of the blades which face with the direction of sheet material movement, i.e., the "trailing" faces. The angle and depth of the bevels are dimensions essential and critical to the successful practice of this invention.

Each of the blades 15 and 16 are preferably also provided with a plurality of drainage apertures, 26 and 27, which consist of a number of holes usually perpendicular to the common plane of the blades and counter-sunk on the trailing side thereof. The diameter of these drainage apertures or holes is preferably about ¼ inch, ±⅛ inch, and they are preferably located on approximately ½ inch to 1 inch centers along the unbeveled, longitudinal edge of each blade.

Referring to FIGURES 4 and 5, one embodiment of a suitable means for holding the doctor blades in the necessary relationship comprises elongated, rigid holding bars 40, to which the individual blades 15 and 16 are rigidly mounted by cap screws 41 and 42 located at the extreme ends of the respective blades. Transverse adjustment of the blades is provided for by elongated slots 43 and 44 cut into the blades. By such adjustment, the gap 45 between the opposing, longitudinal beveled edges of the blades can be suitably widened or narrowed, so as to provide for the exertion of more or less pressure, by the beveled edges, on the viscous, substantially-fluid films of coating composition passing through the gap. Holding bars 40 are shown as rigidly attached, at one of their ends, to a hollow, cylindrical tube, 46. Tube 46 is rotatably mounted to any fixed member, as to the frame of the coating machine, and by any suitable means such as, for example, through trunions 51 and 52, wherein a selected position is shown as being maintained by means of set screws 53 and 54. As shown, the mounting means must allow for the rotative movement of the whole blade assembly in an arc which is perpendicular to the common plane of the blades. It is also essential that the whole blade assembly be mounted, with respect to the remainder of the coating machine, so that the longitudinal axes of the blades are always maintained in a position substantially perpendicular to the direction of sheet material movement through the gap 45. Means for heating the blades can consist, for example, of a suitably-oriented forced draft of hot air or other heating medium, or other heating means can be directly incorporated into the holding means for the blade assembly. Thus, in FIGURE 5, a bayonet-type electrical heating element, 55, is inserted into hollow tube, 46, so as to provide sufficient heat, principally by conduction, to blades 15 and 16. Suitable means for controlling the temperature of the blades are also preferably provided.

The novel method of this invention, as incorporated in a conventional coating process, is shown schematically in FIGURE 1. Sheet material 1 from a source of supply is passed by suitable means, such as guide roll 2, into a receptacle 3 containing a bath of molten coating composition 4. The sheet material is guided through the bath by suitable means, such as guide roll 5, and out of the bath and between doctor blades 15 and 16, which are arranged and shaped as hereinabove described. These blades operate on the still-fluid films of the viscous coating composition in such a way as to even out and smooth the films, while permitting the return of excess coating composition through drainage apertures 26 and 27 into receptacle 3. The common plane of the blades 15 and 16 is rotatably adjusted, by means such as are described in connection with FIGURES 4 and 5, so as to provide the desired thicknesses, equal or otherwise, of coating film on each side of the sheet material. After being operated on by doctor blades 15 and 16, the coated sheet material is further and conventionally treated, such as by being passed over doctor rolls 6 and 7 and guided through a cooling medium 9, such as water contained in receptacle 8, by guide roll 10. The finished coated sheet material is then passed to a convenient storage system.

In order to illustrate the practice and advantages of this invention, a coating composition consisting essentially of 60% by weight of an adhesive petroleum microcrystalline wax and 40% by weight of a very viscous resin is employed to coat paper. The petroleum microcrystalline wax employed has the following typical properties:

| | |
|---|---|
| Melting point (A.S.T.M. D–127–49), °F. | 153 |
| Penetration (A.S.T.M. D–1321–57) at: | |
| 77° F. | 21 |
| 100° F. | 45 |
| 110° F. | 100 |
| Density, g./cc. @ 210° F. | 0.7955 |
| Kinematic viscosity @ 210° F. (A.S.T.M. D–446–53), S.U.S. | 77 |
| Kinematic viscosity @ 210° F. (A.S.T.M. D–445–53T), cs. | 15.4 |
| Absolute viscosity @ 210° F. cps. | 12.25 |

The resin of the coating composition consists of amorphous, high molecular weight copolymers of ethylene and vinyl acetate in the comonomer weight ratio of approximately 2:1, ethylene:vinyl acetate. This resin has the following typical properties:

| | |
|---|---|
| Inherent viscosity @ 30° C. (0.25 Wt. percent in toluene) | 0.78 |
| Melt index (A.S.T.M. D–1238–57T) | 25 |
| Density, g./cc. @ 30° C. | 0.95 |
| Refractive index, $N_D^{25}$ | 1.485 |
| Softening point (ring and ball), °F. | 243 |

In contrast to the above pure microcrystalline wax, which has an absolute viscosity at 210° F. of approximately 12.25 centipoises, the blended coating composition consisting of this wax and 40% by weight of the above resin has an absolute viscosity of 8,060 centipoises at 300° F., and of 16,120 centipoises at 260° F.

When such a composition is applied in accordance with the conventional method of the prior art, and without operation of the doctor blades of this invention, it is found impossible to obtain a thin, even, high-gloss coating on the paper. Instead, a dull and uneven coating is obtained, providing an unsatisfactory appearance. However when the same coating composition is applied in an identical manner, except that the coated sheet material is operated on by the doctor blade assembly of this invention, it is found that a thin, very even, and high-gloss coating of pleasing appearance is obtained.

With other embodiments of this invention, practiced as hereinabove described, substantially similar results are obtained.

I claim:

1. A doctor blade assembly for operating on a moving flexible sheet material coated with an adherent, thin, substantially-fluid film of a normally-solid coating composition, comprising wax and a substantial proportion of a relatively high molecular weight polymer which is very viscous when in the molten state, said assembly comprising, in combination: (a) two elongated doctor blades of rigid material, each of said blades having one longitudinal edge beveled at an angle of about 30° from the transverse axis of the blade to a point not closer than about 0.01 inch to the opposite face of the blade; and (b) means for holding said blades in a longitudinally-opposed, transversely-adjustable, coplanar relationship, and in a position such that the longitudinal axes of the blades are substantially perpendicular to the direction of sheet material movement with the beveled edges of said blades being opposed and oriented so that the bevels face against the direction of sheet material movement, the said holding means also permitting rotatable adjustment of the common plane of the blades in an arc perpendicular to the plane of the blades.

2. A doctor blade asesmbly in accordance with claim 1 wherein each of said blades has, in addition, a plurality of apertures therein along the longitudinal edge other than the beveled longitudinal edge.

3. A doctor blade assembly in accordance with claim 2 which comprises, in addition, means for heating the said doctor blades.

References Cited by the Examiner
UNITED STATES PATENTS

| | | |
|---|---|---|
| 2,027,461 | 1/36 | Anderson. |
| 2,159,151 | 5/39 | Hershberger _____ 117—115 |
| 2,929,352 | 3/60 | Dearsley _____ 118—261 |

FOREIGN PATENTS

| | | |
|---|---|---|
| 547,311 | 8/42 | Great Britain. |

RICHARD D. NEVIUS, *Primary Examiner.*